US010065230B2

United States Patent
Joyce et al.

(10) Patent No.: US 10,065,230 B2
(45) Date of Patent: Sep. 4, 2018

(54) METHODS OF FORMING HOLLOW EXTRUDED VEHICLE FRAME COMPONENT FOR SUBASSEMBLY ATTACHMENT

(71) Applicant: Ford Global Technologies, LLC, Dearborn, MI (US)

(72) Inventors: John Joyce, Saline, MI (US); Christopher John May, Novi, MI (US); Jack Lashbrook, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 14/816,415

(22) Filed: Aug. 3, 2015

(65) Prior Publication Data

US 2015/0336157 A1 Nov. 26, 2015
US 2017/0151603 A9 Jun. 1, 2017

Related U.S. Application Data

(60) Division of application No. 14/215,504, filed on Mar. 17, 2014, now Pat. No. 9,174,680, which is a
(Continued)

(51) Int. Cl.
*B21D 7/00* (2006.01)
*B21D 47/01* (2006.01)
(Continued)

(52) U.S. Cl.
CPC .............. *B21D 47/01* (2013.01); *B21D 7/00* (2013.01); *B62D 25/06* (2013.01); *B62D 65/00* (2013.01)

(58) Field of Classification Search
CPC .......... B21D 47/01; B21D 7/00; B62D 65/00; B62D 29/008; B62D 25/06; Y10T 29/49623; Y10T 29/49622
See application file for complete search history.

(56) References Cited

U.S. PATENT DOCUMENTS 3,132,891 A 5/1964 Pyuro et al.
3,326,599 A 6/1967 Pashenee
(Continued)

FOREIGN PATENT DOCUMENTS

DE 10336901 B3 5/2005
EP 1759960 A2 3/2007
(Continued)

OTHER PUBLICATIONS

"Rugged Ridge Extruded Aluminum Windshield Header (2 & 4 Door JK 2007-2013)," printed May 24, 2013, http://www.fueled4wd.com/Rugged_Ridge_Windshield_Header_p/frr-13308.05.htm, 4 pages.
(Continued)

*Primary Examiner* — Richard Chang
(74) *Attorney, Agent, or Firm* — Jason Rogers; Price Heneveld LLP

(57) ABSTRACT

A frame component of a vehicle, such as a header beam that couples between the A-pillars of a vehicle frame, includes an extruded hollow member having top and bottom exterior walls and side walls that together enclose an elongated internal volume of the hollow member. A pair of interior walls extends along the internal volume separating outer load sections adjacent to the side walls from a central attachment section. The outer load sections are void of apertures for supporting continuous load paths. A formation on the bottom exterior wall protrudes into the internal volume in the central attachment section. The formation includes an inset surface angled, located, and otherwise
(Continued)

configured for attaching a subassembly to the frame component.

19 Claims, 9 Drawing Sheets

Related U.S. Application Data continuation-in-part of application No. 14/076,746, filed on Nov. 11, 2013, now Pat. No. 9,027,989, which is a continuation-in-part of application No. 14/062,510, filed on Oct. 24, 2013, now Pat. No. 9,199,293, and a continuation-in-part of application No. 14/062,568, filed on Oct. 24, 2013, now Pat. No. 8,998,307.

(51) Int. Cl.
  *B62D 65/00*   (2006.01)
  *B62D 25/06*   (2006.01)

(56) References Cited

U.S. PATENT DOCUMENTS

| | | |
|---|---|---|
| 3,526,426 A | 9/1970 | Wessells |
| 4,252,364 A | 2/1981 | Toyama et al. |
| 5,018,781 A | 5/1991 | Kumasaka et al. |
| 5,048,887 A | 9/1991 | Kunishima et al. |
| 5,096,254 A | 3/1992 | Sparke |
| 6,065,261 A | 5/2000 | Fehr et al. |
| 6,116,680 A | 9/2000 | Hunter et al. |
| 6,325,450 B2 | 12/2001 | Sakyo et al. |
| 6,499,798 B2 | 12/2002 | Takemoto |
| 6,557,930 B1 | 5/2003 | Bruggermann et al. |
| 6,584,689 B2 | 7/2003 | Bruggemann et al. |
| 6,758,511 B2 | 7/2004 | Taylor et al. |
| 6,869,135 B2 | 3/2005 | Forssell |
| 6,929,312 B2 | 8/2005 | Rich et al. |
| 6,964,096 B2 * | 11/2005 | Tryland ............... B21C 23/14 29/897.2 |
| 7,077,462 B1 | 7/2006 | De Gaillard |
| 7,506,911 B2 | 3/2009 | Lee |
| 7,543,883 B2 | 6/2009 | Chen et al. |
| 7,699,386 B2 | 4/2010 | Fukumoto |
| 7,914,072 B2 | 3/2011 | Queener et al. |
| 8,246,109 B2 | 8/2012 | Wykoff et al. |
| 8,641,133 B1 | 2/2014 | Scaringe et al. |
| 8,651,566 B2 | 2/2014 | Nakaaki |
| 8,746,787 B2 | 6/2014 | Adamski |
| 2004/0021339 A1 | 2/2004 | Taylor et al. |
| 2009/0033128 A1 | 2/2009 | Hoelzel |
| 2010/0038932 A1 | 2/2010 | Comfort et al. |
| 2012/0104803 A1 | 5/2012 | Thomas et al. |
| 2013/0026779 A1 | 1/2013 | Kuroki et al. |
| 2013/0181487 A1 | 7/2013 | Krueger et al. |
| 2013/0200657 A1 | 8/2013 | Shirai |
| 2014/0008940 A1 | 1/2014 | Adamski |
| 2014/0123495 A1 | 5/2014 | Hill et al. |
| 2014/0138988 A1 | 5/2014 | Kisaku et al. |
| 2014/0217783 A1 | 8/2014 | Hida et al. |

FOREIGN PATENT DOCUMENTS

| | | |
|---|---|---|
| GB | 639911 | 7/1950 |
| JP | 2006240420 A | 9/2006 |
| JP | 2009113690 A | 5/2009 |
| JP | 2010013021 A | 1/2010 |
| JP | 2011136623 A | 7/2011 |
| JP | 2012081878 | 4/2012 |

OTHER PUBLICATIONS

"National Code of Practice for Light Vehicle Construction and Modification," Vehicle Standards Bulletin 14, Section LH Body and Chassis, Jan. 2011, 73 pages, Version 2.0.

* cited by examiner

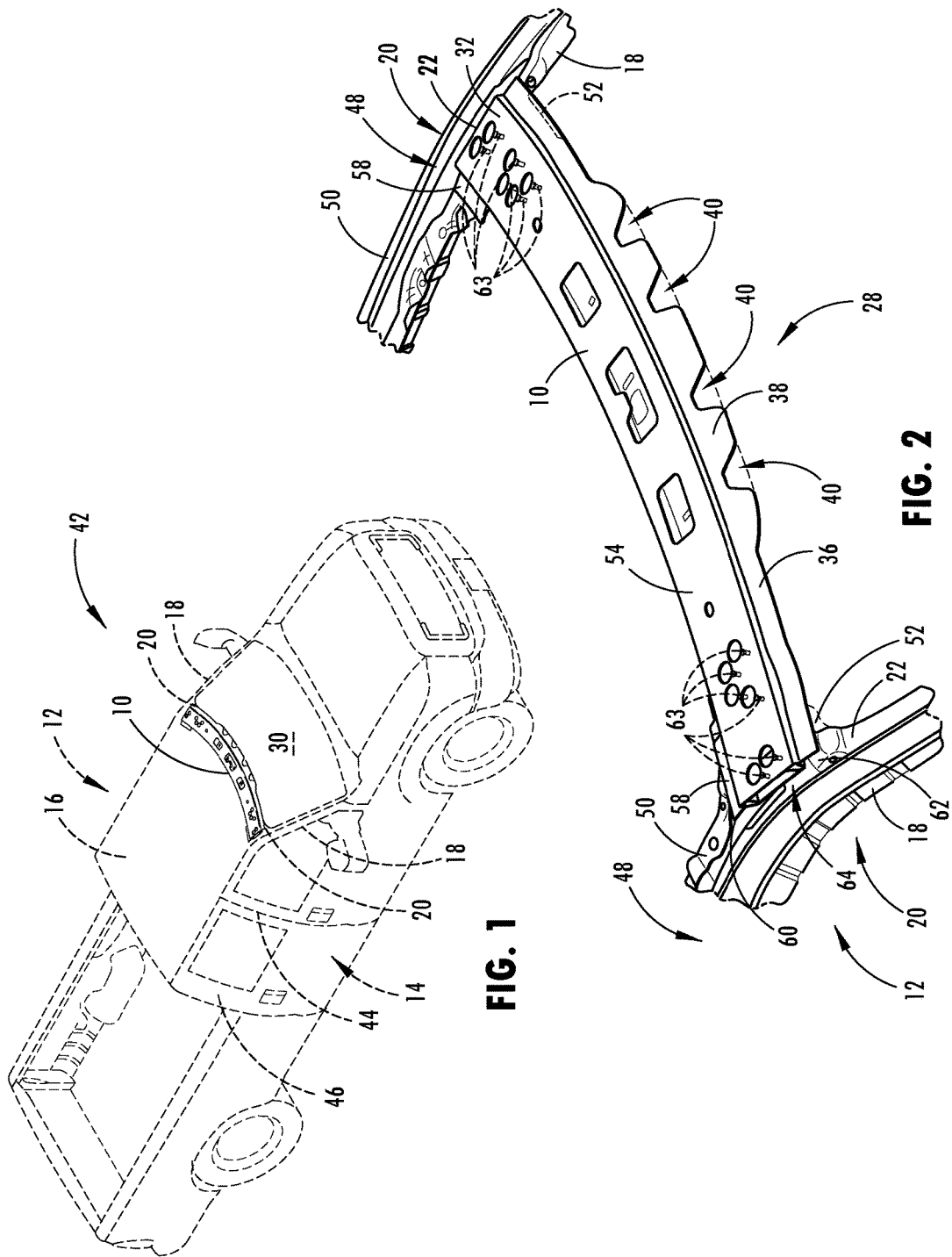

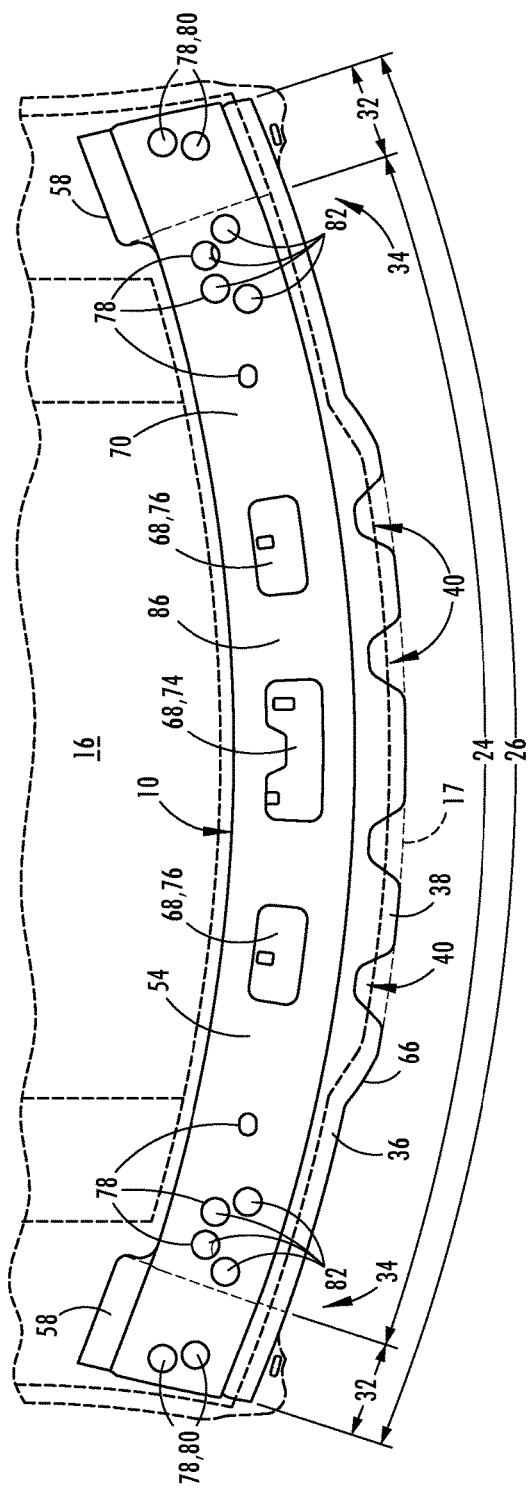
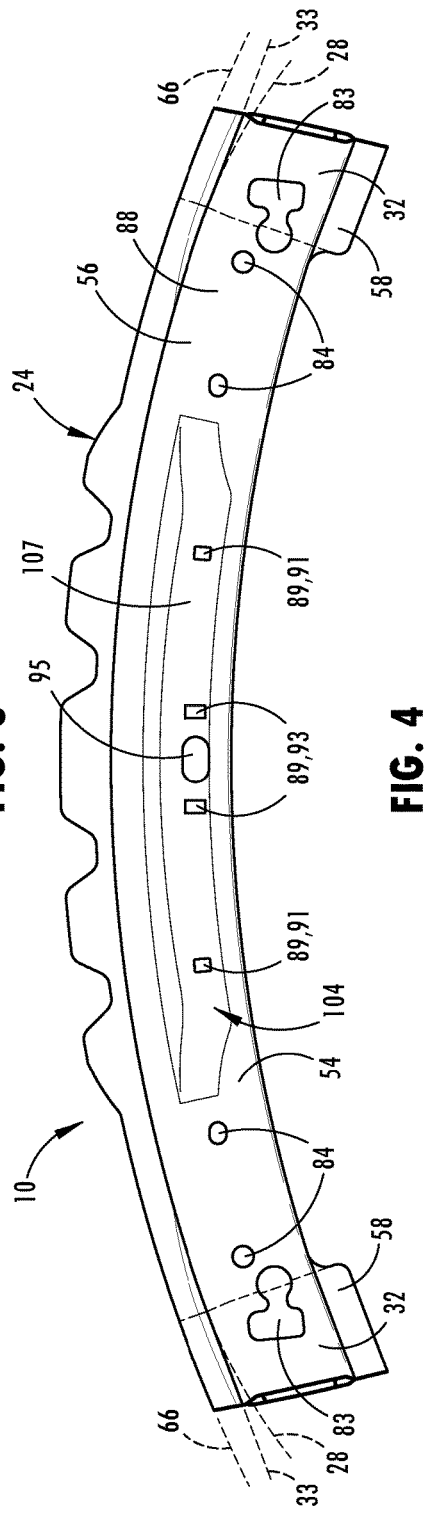
FIG. 3
FIG. 4

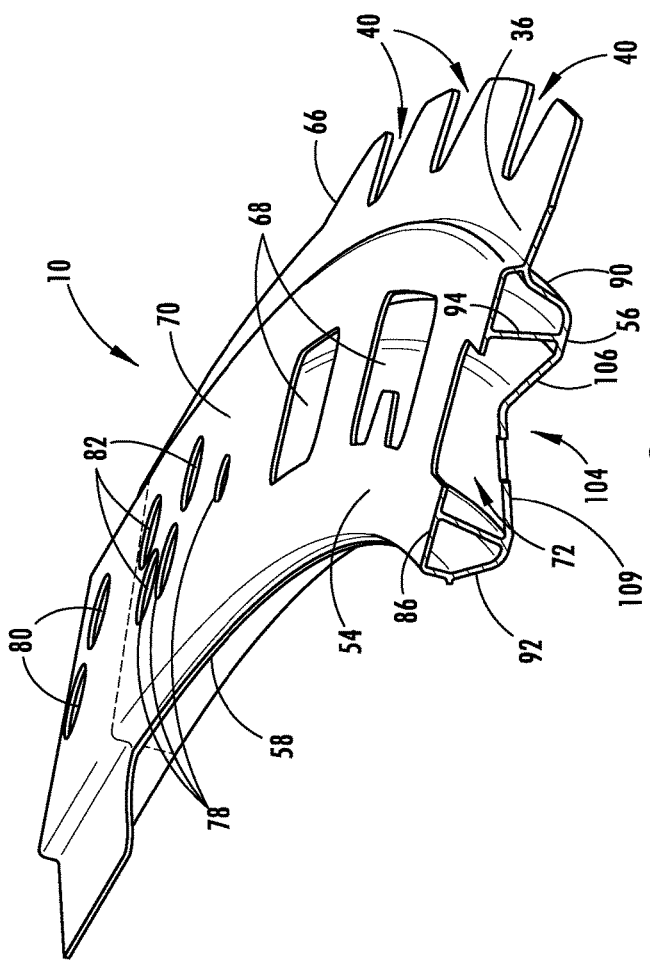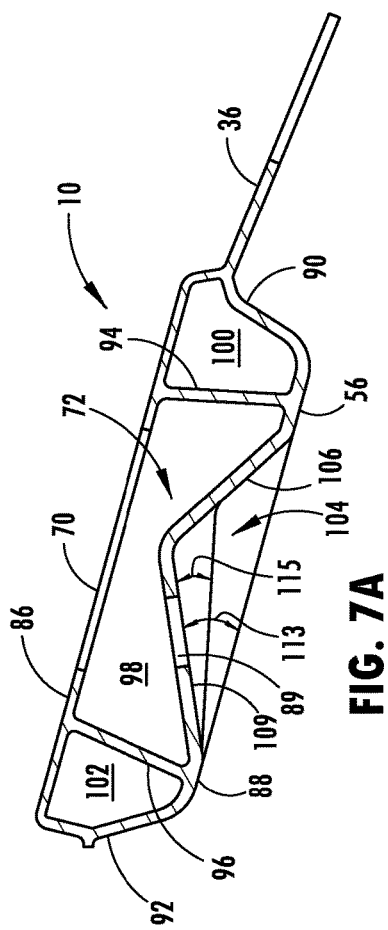

METHODS OF FORMING HOLLOW EXTRUDED VEHICLE FRAME COMPONENT FOR SUBASSEMBLY ATTACHMENT

CROSS-REFERENCE TO RELATED APPLICATIONS

This application is a divisional of U.S. patent application Ser. No. 14/215,504, filed on Mar. 17, 2014, now issued as U.S. Pat. No. 9,174,680, which is a continuation-in-part of U.S. patent application Ser. No. 14/076,746, filed on Nov. 11, 2013, now issued as U.S. Pat. No. 9,027,989, entitled "EXTRUDED BODY COMPONENT WITH NOTCHED FLANGE TO REDUCE STRAIN IN BENDING," which is a continuation-in-part of U.S. patent application Ser. No. 14/062,510, now issued as U.S. Pat. No. 9,199,293 filed on Oct. 24, 2013, entitled "HEADER BEAM OF A VEHICLE FRAME AND METHOD OF FORMING THE SAME," and U.S. patent application Ser. No. 14/062,568, filed on Oct. 24, 2013, now issued as U.S. Pat. No. 8,998,307, entitled "HEADER BEAM OF A VEHICLE FRAME AND METHOD OF FORMING THE SAME." The aforementioned related applications are hereby incorporated by reference.

FIELD OF THE INVENTION

The present invention generally relates to extruded frame components for a vehicle, and particularly relates to hollow extruded header beams that are provided with areas configured for joining the header beam to other components of the vehicle, attaching subassemblies, or otherwise facilitating assembly of the vehicle frame.

BACKGROUND OF THE INVENTION

It is generally understood that vehicle frames typically have a header beam that spans between the A-pillars of the vehicle frame to support the roof and windshield. In addition to providing structural support, header beams and other frame components are commonly used as attachment points for other subassemblies of the vehicle, such as visors and overhead consoles. Providing attachment points along the length of a frame component can have a tendency to reduce the structural integrity of the frame component, making the use of lightweight extruded metal for header beams more difficult. As it becomes more desirable for vehicles to be built with lighter materials, it is increasingly desirable to utilize components made with extruded metal that have few structural discontinuities and adhere to higher safety standards.

SUMMARY OF THE INVENTION

According to one aspect of the present invention, a method for forming a vehicle header beam is provided. The method includes: providing an extruded hollow member having exterior walls enclosing an elongated internal volume and a pair of interior walls extending along the elongated internal volume; bending the extruded hollow member to form a curvature; and forming a formation in a bottom exterior wall that protrudes into the elongated internal volume between the pair of interior walls for attaching a subassembly.

According to another aspect of the present invention, a method for forming a vehicle header beam is provided. The method includes: providing an extruded hollow member having exterior walls enclosing an elongated internal volume and an interior wall extending along the internal volume separating load and attachment sections; forming a formation in one of the exterior walls protruding into or out of the attachment section; and forming a substantially planar outer surface in the formation disposed at an angle and a location configured for attaching a subassembly.

According to yet another aspect of the present invention, a method for forming a vehicle header beam is provided. The method includes: bending an extruded hollow member having exterior walls enclosing an elongated internal volume and an interior wall extending along the internal volume separating load and attachment sections; forming a formation in one of the exterior walls protruding into or out of the attachment section; and configuring the formation with a substantially planar outer surface for attaching a subassembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a vehicle having a header beam according to one embodiment of the present invention;

FIG. 2 is a top perspective view of the header beam depicted in FIG. 1, showing the header beam spanning between a corresponding pair of A-pillars according to one embodiment;

FIG. 3 is a top plan view of the header beam depicted in FIG. 1, showing portions of a roof panel according to one embodiment;

FIG. 4 is a bottom plan view of the header beam depicted in FIG. 1, showing one embodiment of a formation in the bottom wall;

FIG. 5A is a cross-sectional end view of the header beam shown in FIG. 5;

FIG. 7 is a top perspective cross-sectional view of the header beam depicted in FIG. 6, showing the formation at a location laterally spaced from the cross-sectional view of FIG. 6;

FIG. 7A is a cross-sectional view of the header beam taken at the location of the cross section shown in FIG. 7;

DETAILED DESCRIPTION OF THE PREFERRED EMBODIMENTS

Figure 5:
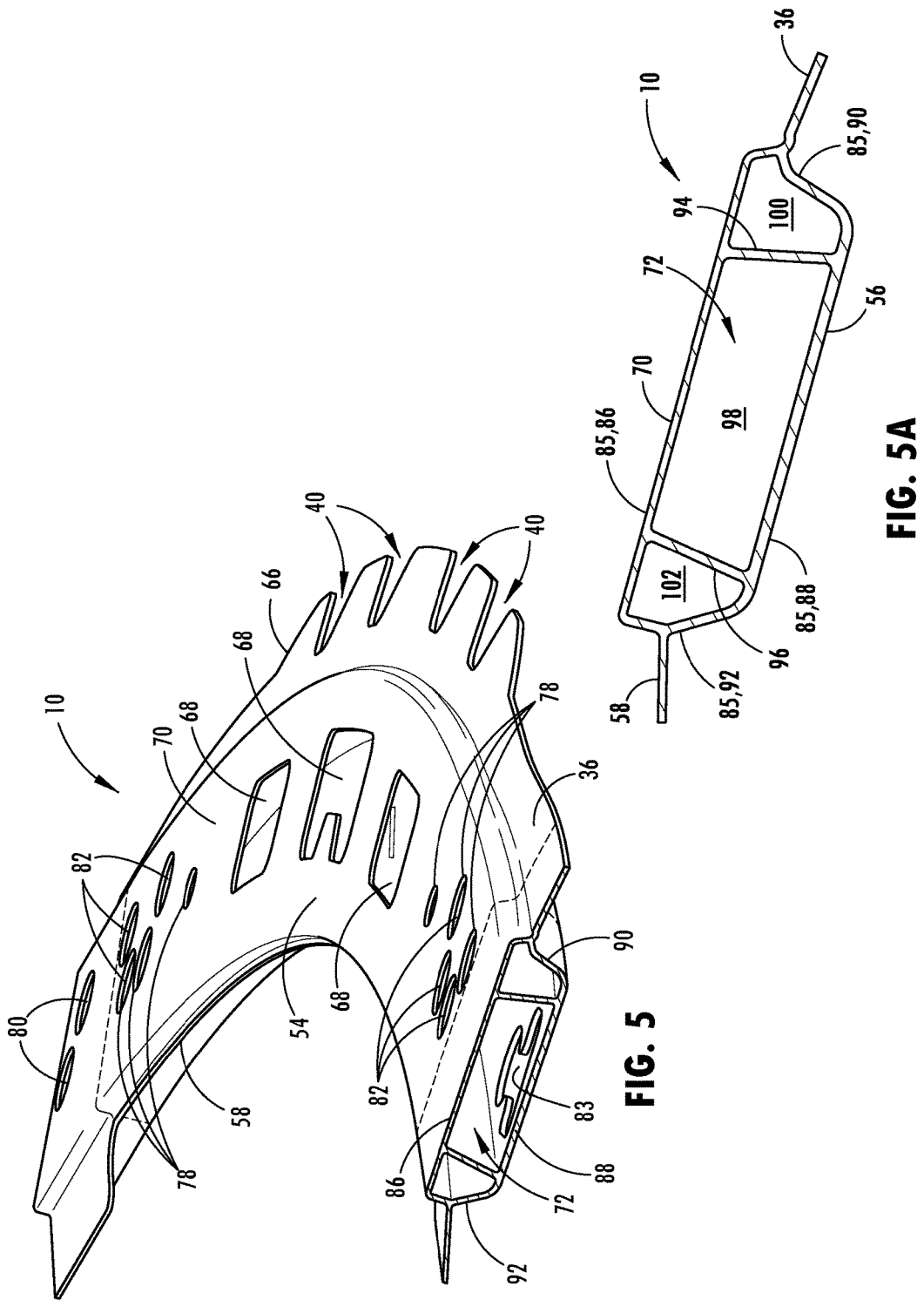
FIG. 5 is a top perspective end view of the header beam depicted in FIG. 1, showing a hollow internal volume of the header beam according to one embodiment.

For purposes of description herein, the terms "upper," "lower," "right," "left," "rear," "front," "vertical," "horizontal," and derivatives thereof shall relate to the vehicle and components illustrated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a header beam for a frame 12 of a vehicle 42. In the illustrated embodiment, the header beam 10 is a component of the vehicle frame 12 that includes an extruded hollow member having exterior walls 85 that encloses an elongated internal volume 72. The extruded hollow member is also formed with at least one interior wall extending along the elongated internal volume 72 separating a load section from an attachment section 98. The attachment section 98 is separated from the load section, such that a formation 104 may be made at a select location in one of the exterior walls 85 of the attachment section 98 that protrudes into or out of the internal volume 72 and includes an outer surface 107 configured for attaching a subassembly. The header beam 10 of the illustrated embodiment may be fabricated from any material capable of being extruded and further manufactured through flexing, stretch bending, and other contemplated forming processes. For example, the header beam 10, according to one embodiment may be fabricated from an aluminum alloy, which may preferably be a 6000 series extruded aluminum alloy, and may more preferably a be 6082-T4 extruded alloy, tempered to a T6 condition after fabrication.

Referring now to FIG. 1, the illustrated vehicle 42 is shown having one embodiment of the vehicle frame component of the present invention, the header beam 10, spanning between a pair of A-pillars 18 in a curvature 28 that conforms to a windshield 30 of the vehicle 42. The A-pillars 18 are attached to end portions 32 of the header beam 10 to also support a front portion of a roof panel 16 of the vehicle 42. Rearward from the A-pillars 18 of the illustrated vehicle 42, the vehicle frame 12 has additional pillars, including B-pillars 44, and C-pillars 46, that extend upward around an interior cabin of the vehicle 42 to provide additional support to portions of the roof panel 16. However, it is conceivable that the header beam 10 may be incorporated in frames of alternative types of vehicles, such as a car, a sport utility vehicle, or a van, that may have alternative frame components, such as more or fewer pillars to support the roof panel 16 or the header beam 10. Further, it is also contemplated that the header beam 10 may be configured for supporting a moon roof assembly, a convertible roof assembly, or other alternative roof configuration, as generally understood by one having ordinary skill in the art.

As illustrated in FIG. 2, the A-pillars 18 each couple with and support a front end 48 of a longitudinal roof rail 50, which extends rearward from the header beam 10 to support the lateral sides of the roof panel 16 and any additional cross members that may span laterally across the vehicle 42. The longitudinal roof rails 50 integrally couple with top ends 20 of the A-pillars 18 to form an angled connection, whereby the A-pillars 18 extend down and forward at an angled design of the windshield 30 (FIG. 1). The header beam 10 generally spans between the angled connections between the A-pillars 18 and the longitudinal roof rails 50. It is contemplated that the A-pillars 18 and the longitudinal roof rails 50 may be an integral piece along with other pillars or cross members of the vehicle frame 12 or may be individual parts that are attached directly together or separated by other structural members. Furthermore, it is understood that in the illustrated embodiment the A-pillars 18 and longitudinal roof rails 50, along with other components of the vehicle frame 12 and the vehicle 42, have corresponding parts on opposing lateral sides of the vehicle 42 that are substantially mirror images of each other, such that illustration and description of one may be inferred to the other, unless specified to the contrary.

With further reference to FIG. 2, the top ends 20 of the A-pillars 18 have inward protruding attachment members 52 that define upper surfaces 22 of the A-pillars 18 for mating with the header beam 10. The attachment members 52 are configured to have a shape that conforms to the end portions 32 of the header beam 10 for attachment therewith. More specifically, in the illustrated embodiment, the header beam 10 has a hollow body portion 54 with a front flange 36 and a rear flange 58 on opposing sides of the body portion 54. The front and rear flanges 36, 58 proximate the end portions 32 of the header beam 10 are adapted to couple with raised portions of the attachment member 52. Accordingly, in the illustrated embodiment, upper and lower raised portions 60, 62 on opposing sides of the cavity 64 engage the rear flange 58 and the front flange 36, respectively, and a cavity 64 between the raised portions 60, 62 directly attaches with a bottom surface 56 of the body portion 54, further define as the lower most surface of a bottom wall 88 of the header beam 10.

As also shown in the embodiment illustrated in FIG. 2, the connection between the attachment members 52 and the header beam 10 is effectuated by a series of self-tapping rivets 63 that extend though the body portion 54 of the header beam 10 proximate the end portions 32 and attach within the cavity 64 of the attachment member 52. In other embodiments, it is contemplated that the connection between the attachment members 52 and the header beam 10 may be made by additional or alternative means, including welding, fastening, and other generally appreciated means of attachment by one having ordinary skill in the art. It is also contemplated that the attachment members 52 may be separate components from the A-pillars 18 that are directly attached to either the header beam 10 or the A-pillars 18. The attachment members 52 in other conceivable embodiments may also protrude inward more or less than the illustrated embodiment or be entirely encompassed within the width of the A-pillars 18.

As illustrated in FIG. 3, a top surface 70 of the header beam 10 is shown with a central portion 24 of a length 26 of the header beam 10 spanning between the end portions 32 that attach to the A-pillars 18 (FIG. 2) and sweeping forward in the curvature 28 (FIG. 4) corresponding to the curvature of the windshield 30 (FIG. 1). The roof panel 16 in the illustrated embodiment attaches to the header beam 10 and conforms to a front edge 66 (FIG. 4) of the header beam 10, defined by the front flange 36. The front flange 36 of the header beam 10 protrudes generally horizontally from the body portion 54 and extends along the length 26 of the header beam 10. The front flange 36 in the illustrated embodiment is formed to protrude further forward proximate a center region 38 to define a tongue portion that protrudes forward a greater distance than the front flange 36 proximate the end portions 32. Accordingly, the center region 38 of the front flange 36 has a depth that accommodates a series of notches 40 spaced along the front edge 66 to reduce strain from bending and to provide points of attachment between a forward edge 17 of the roof panel 16 and the front edge 66 of the header beam 10. The series of notches 40 may have a variety of shapes and spacing arrangements along the front flange 36, and preferably have smooth surfaces and large radii to reduce the likelihood of any localized stress concentration-related fatigue effects. The front edge 66 of the front flange 36 is also formed proximate the end portions 32 to be parallel to the curvature 28 of the body portion 54 of the header beam 10 proximate the central portion 24, thereby conforming with the curvature of the windshield 30 (FIG. 1). In additional embodiments, it is contemplated that the tongue portion and the notches may be omitted or alternatively shaped, such that the front edge 66 may be parallel to the curvature 28 (FIG. 4) of the body portion 54 proximate the center region 38 and thereby provide a consistent curvature of the front edge 66 along the length 26 of the header beam 10.

Referring now to FIGS. 3-4, the curvature 28 of the central portion 24 of the header beam 10 is accentuated by dashed lines shown extending beyond the central portion 24 to intersect with the end portions 32, thereby illustrating the discontinuous shape along the overall length 26 of the header beam 10. Similarly, proximate the end portion 32, the generally straight orientation 33 of the body portion 54 is shown with dashed lines extending beyond the length 26 of the header beam 10 to illustrate the divergence from the curvature 28 of the central portion 24 of the header beam 10. Further, the front edge 66 of the front flange 36 is shown extending beyond the length 26 of the header beam 10 in parallel alignment with the curvature 28 of the central portion 24, thereby diverging from the straight orientation 33 of the body portion 54 proximate the end portions 32. In the illustrated embodiment, the curvature 28 of the central portion 24 is a substantially continuous arc along a circumference, although it is understood that the curvature 28 in additional embodiments may not be consistent along the central portion 24, such as being more exaggerated near the end portions 32 and straighter in the center or more or less exaggerated at other various locations along the central portion 24.

With further reference to the embodiment shown in FIG. 3, a number of access holes 68 are formed in a top wall 86 of the body portion 54, proximate the center region 38 of the front flange 36, that extend into the internal volume 72 (FIG. 5) of the header beam 10. The access holes 68 are formed in the attachment section 98, between the interior walls 94, 96 (FIG. 5A) of the extruded hollow member, as explained in more detail below. The access holes 68 facilitate access to the internal volume 72 for providing support to an upper surface of the bottom wall 88 when deforming the bottom wall 88 upward to create the formation 104 for attaching, locating, or joining, as also described in more detail below. The access holes 68 may be formed of various shapes and sizes to permit the necessary area for accessing the internal volume 72 or to otherwise conform with attachment features that may couple with the access holes 68.

In the embodiment illustrated in FIG. 3, the access holes 68 include a center access hole 74 having a generally rectangular shape and a rear protrusion extending forward into the rectangular shape at approximately a midpoint of the header beam 10. The rear protrusion of the center access hole 74 may be used to attach a portion of the roof structure and thereby support the roof panel 16. The access holes 68 also include a pair of lateral access holes 76 that are positioned at equally spaced locations on opposing sides of the center access hole 74 and similarly include a generally rectangular shape. Several additional access holes 78 are also formed through the top wall 86 within the attachment section, but proximate the end portions 32 of the header beam 10. These additional access holes 78 include two distal holes 80 on each end portion 32 and a grouping of four circular holes 82 slightly inward from the two distal holes 80. Similarly, these additional access holes 78 may be used for inserting forming or attachment tools, and in the illustrated embodiment are used for providing access for connecting the self-tapping rivets 63 (FIG. 2) through the bottom wall 88 of header beam 10 for attachment to the A-pillars 18. However, it is also contemplated that the additional access holes 78 may also be used to attach portions of the roof panel 16 or other vehicle components.

Referring now to FIG. 4, the bottom surface 56 of the header beam 10 is shown having interior-facing connection apertures formed through the bottom wall 88 proximate the end portions 32 of the header beam 10. The connection apertures are formed in the attachment section 98 of the header beam 10 between the interior walls 94, 96 (FIG. 5A), as described in more detail below. In the illustrated embodiment, the connection apertures include a visor connection aperture 83 formed with an outer rectangular portion and an inner circular portion that combine to form a shape configured for attaching a visor assembly to the header beam 10, as generally understood by one having ordinary skill in the art. The visor connection aperture 83 may also be used to interface and align the header beam 10 with the attachment members 52. In addition, the illustrated embodiment includes smaller connection apertures 84 that are provided inward from the visor connection apertures 83 and that are configured for attaching a headliner assembly, as generally known in the art. It is understood that more or fewer connection apertures may be provided in various shapes and spacing along the bottom wall 88, and any of these connection apertures may be configured to accommodate various potential attachment points for attaching alternative interior trim pieces or subassemblies to the header beam 10, for locating functionality, and for aligning and positioning the header beam 10 on the vehicle 42. Furthermore, the connection apertures may be formed by stamping, milling, drilling, or other conceivable forming processes to extend the connection aperture through the bottom wall 88 of the body portion 54.

In addition to the connection apertures 83, 84 formed through the bottom wall 88, FIG. 4 also illustrates one embodiment of the formation 104 in the bottom wall 88 proximate the center region 38 of the front flange 36. The illustrated embodiment of the formation 104 protrudes into the internal volume and thereby the outer surface is defined as an inset surface 107 in the bottom wall that is angled relative to a planar extent of the bottom wall proximate the formation. The inset surface 107 of the embodiment illustrated in FIG. 4 has a substantially continuous angle along the formation, although the angle of the inset surface 107 may vary in additional embodiments. The formation 104 protrudes into the internal volume 72 within the central attachment section 98 and provides the inset surface 107 on the bottom surface 56 for attaching subassemblies that may require an alternative angle of attachment from the surrounding portions of the bottom surface 56. It is contemplated that in additional embodiments that the inset surface 107 of the formation 104 may have a curvature or shape that is not substantially planar to accommodate the attachment of a certain subassembly. Furthermore, it is understood that in additional embodiments that the formation 104 may protrude out of the internal volume 72, in an opposite direction from the illustrated embodiment, and the formation 104 may also alternatively be formed in the top wall 86, which may be accessed from apertures in the bottom wall 88.

In the embodiment illustrated in FIG. 4, a number of attachment apertures 89 are formed in the inset surface 107 through the bottom wall 88 for receiving a fastener to secure a subassembly to the header beam 10, as generally understood by one having ordinary skill in the art. Specifically, the attachment apertures 89, as illustrated, include central attachment apertures 93 and lateral attachment apertures 91 in the inset surface 107. The central attachment apertures 93 are disposed at a generally centered location along the length 26 of the header beam 10 for attaching an overhead console assembly and the lateral attachment apertures 91 are disposed at a laterally spaced location along the length 26 from the central attachment apertures 93 for attaching a check assembly for an associated visor assembly that may be secured in a visor connection aperture 83. The inset surface 107 is also illustrated to include a bottom surface access hole 95 that may be used for operating riveting tools, for locating, or other contemplated functions.

The body portion 54 of the header beam 10, as shown in FIGS. 5-5A, is hollow, and thereby is also referred to as the extruded hollow member herein. The body portion 54 is bordered by exterior walls 85, including a top wall 86, a bottom wall 88, a front side wall 90, and a rear side wall 92 to enclose the internal volume 72. The front flange 36 extends forward from a midregion of the front side wall 90, and similarly, the rear flange 58 extends rearward from a midregion of the rear side wall 92. In the illustrated embodiment, a forward interior wall 94 and a rearward interior wall 96 extend linearly between the top wall 86 and the bottom wall 88 and span continuously within the internal volume 72 along the length 26 of the header beam 10. In the illustrated embodiment, the forward and rearward interior walls 94, 96 are formed at outward angles from the top wall 86 to the bottom wall 88 to increase the amount of support for the top wall 86 during bending of the header beam 10 and to increase the amount available area within the attachment section 98 on the bottom wall 88 for joining and attaching subassemblies or other vehicle components. Accordingly, the forward and rearward interior walls 94, 96 angle away from each other as they extend downward from the top wall 86 to the bottom wall 88, such that the interior walls 94, 96 proximate the bottom wall 88 are spaced at a greater distance than proximate the top wall 86. The internal volume 72 is thereby divided by the forward and rearward interior walls 94, 96 into the central attachment section 98, a forward load section 100, and a rearward load section 102, whereby the forward and rearward load sections 100, 102 have similar sizes and define uninterrupted box sections that are void of attachment apertures or other interruptions. It is understood that in additional embodiments more or fewer interior walls that may be formed to vertically extend within the internal volume 72 to alternatively support the top wall 86 away from the bottom wall 88 and divide the attachment section 98 from at least one load section.

Figure 6:
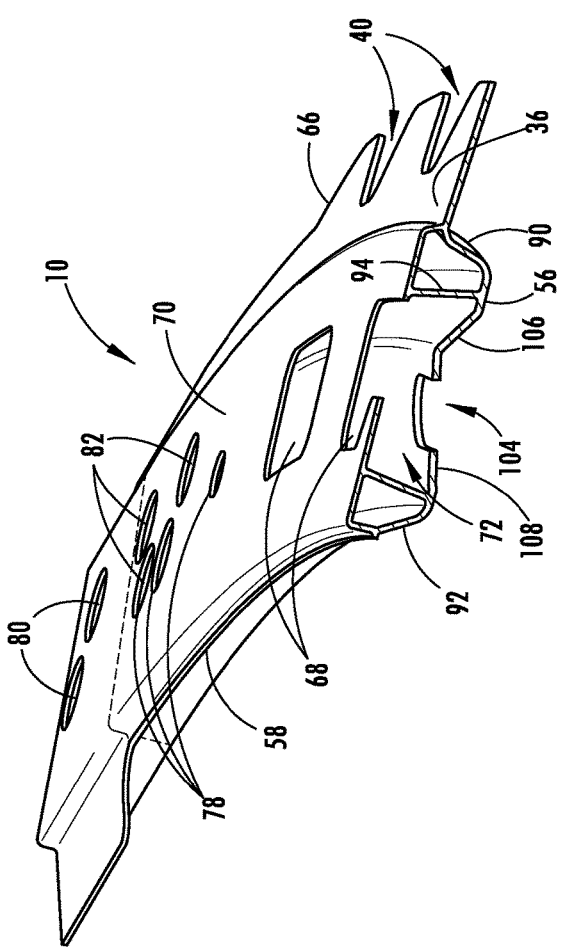
FIG. 6 is a top perspective cross-sectional view of the header beam depicted in FIG. 1 taken at a centered location of the header beam, showing a formation protruding into the hollow internal volume according to another embodiment.
Figure 6A:
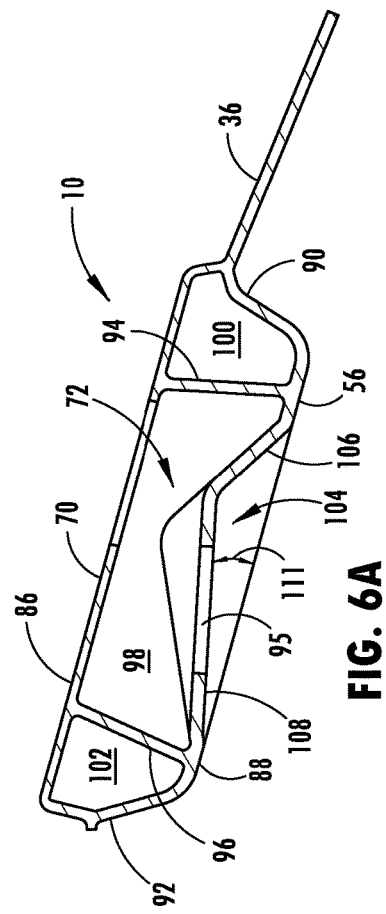
FIG. 6A is a cross-sectional view of the header beam taken at the centered location of the cross section shown in FIG. 6.
Figure 7B:
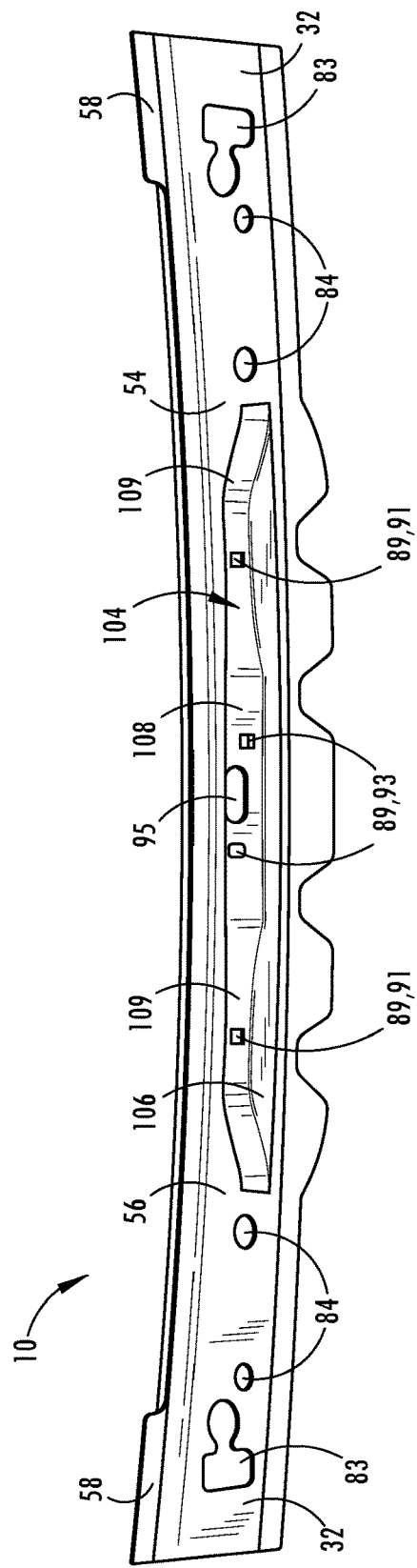
FIG. 7B is a bottom perspective view of the header beam depicted in FIG. 6.

As illustrated in FIGS. 6-7B, an additional embodiment of the formation 104 is depicted that includes a first inset surface 108 and a second inset surface 109 spaced laterally from the first inset surface 108 and oriented at a different angle than the first inset surface 108. The illustrated embodiments of the first and second inset surfaces 108, 109 each having a generally planar configuration and are separately configured for a different type of attachment, such as the attachment of different subassemblies or vehicle components. With reference to FIGS. 6-6A, the illustrated cross section is taken at a generally centered location through the center access hole 74 in the top wall 86 and through the bottom surface access hole 95 in the bottom wall 88. As such, the first inset surface 108 shown in FIGS. 6-6A is oriented at a first angle 111 relative to the planar extent of the bottom wall proximate the formation. The first inset surface 108 angles inward and forward from the rearward interior wall 96. The illustrated embodiment of the formation 104 also includes a corresponding secondary inset surface 106 that angles inward and rearward from the forward interior wall 94 and meets the first inset surface 108 at a first angled connection within the internal volume 72 and spaced away from the top wall 86.

With reference to FIGS. 7-7A, the illustrated cross section is taken at a laterally spaced location from the first inset surface 108, namely through one of the lateral access holes 76 in the top wall 86 and through the attachment aperture in the bottom wall 88. As such, the second inset surface 109 shown in FIGS. 7-7A is oriented at a second angle 113 relative to the planar extent of the bottom wall, whereby the first angle 111 is less inclined than the second angle 113, defining an offset angle 115 between the first and second inset surfaces 108, 109. The second inset surface 109, similar to the first inset surface 108, angles inward and forward from the rearward interior wall 96. The corresponding secondary inset surface 106 proximate the second inset surface 109 in the illustrated embodiment also angles inward and rearward from the forward interior wall 94 and meets the second inset surface 109 at a second angled connection, further within the internal volume 72 than the first angle connection, yet still spaced away from the top wall 86.

As illustrated in the embodiment depicted in FIG. 7B, the first and second inset surfaces 108, 109 each include an attachment aperture 89 formed through the bottom exterior wall 88 for receiving a fastener to secure first and second subassemblies, respectively, to the extruded hollow member. In the illustrated embodiment, the formation includes a continuous depressed area 117 between the first and second inset surfaces 108, 109. However, it is understood that the formation 104 may be segmented at various points along the header beam 10, have an alternative shape, and/or may otherwise be modified in a parallel configuration with the bottom wall for attaching subassemblies of the vehicle that do not require a surface with an alternative angle of attachment from the bottom wall.

Figure 8:
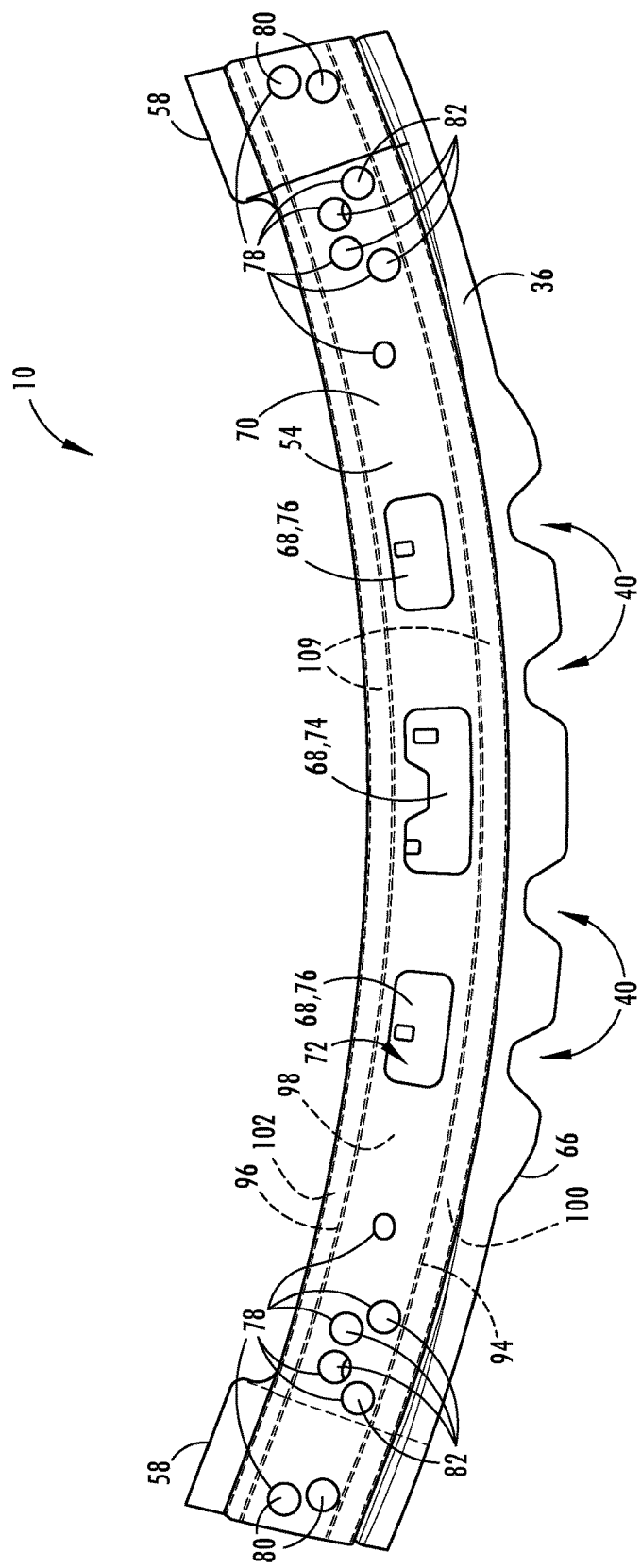
FIG. 8 is a top plan view of the header beam depicted in FIG. 1, showing interior walls in dashed lines extending along the hollow internal volume.

As further shown in FIG. 8, the forward and rearward interior walls 94, 96 extend continuously within the internal volume 72 along the length 26 of the header beam 10. The corresponding forward and rearward load sections 100, 102 of the internal volume 72, accordingly, extend along the length 26 of the header beam 10 to define continuous and uninterrupted box sections that have a generally tubular shape and extend along the front and rear edges of the body portion 54. The uninterrupted box sections do not contain any holes, apertures, or other discontinuities along the length 26 of the header beam 10 to provide continuous load paths along the length 26 of the header beam 10 and to provide consistent structural support between the A-pillars 18 and along the front of the roof panel 16. The uninterrupted box sections are thereby designed to absorb impact forces and to carry loads placed on the header beam 10 from normal operating conditions of the vehicle 42. The central attachment section 98 between the load sections 100, 102 secures the uninterrupted box sections to each other to prevent splaying or torsion between the uninterrupted box sections. Also, due to the uninterrupted box sections carrying the primary loads on the header beam 10, the apertures, holes, formations, and other features formed on the top and bottom walls 86, 88 do not structurally compromise the header beam 10.

Figure 9:
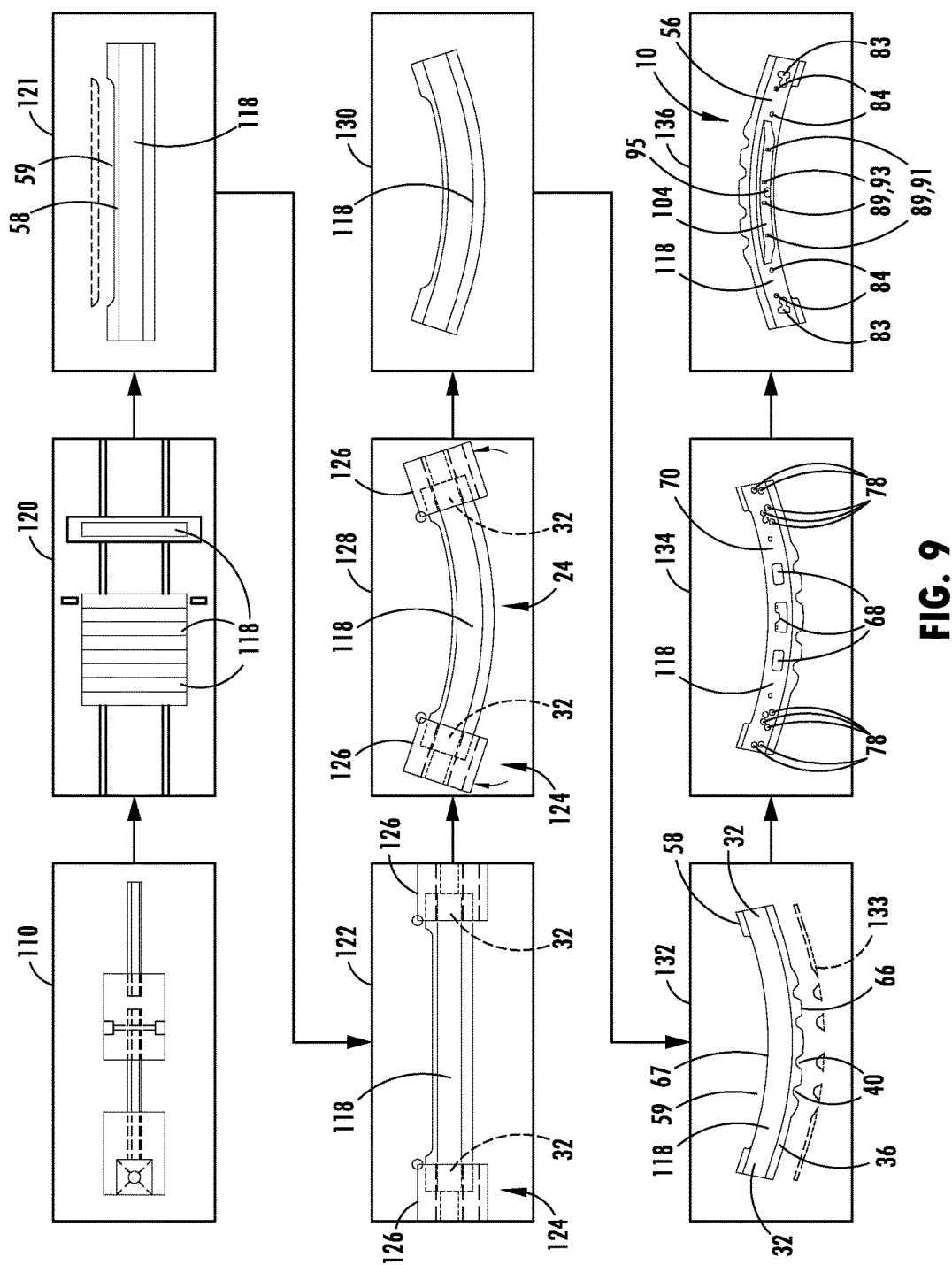
FIG. 9 is a flowchart showing a method of forming a header beam, according to another embodiment.

Referring now to FIG. 9, a flowchart illustrates one embodiment of the method of forming the header beam 10. At step 110, a continuous beam 112 is extruded from an extrusion die 114 to have the internal volume 72 (FIG. 5) with the forward and rearward interior walls 94, 96 (FIG. 5A) extending continuously within the internal volume 72 to define the central attachment section 98 and the forward and rearward load sections 100, 102 (FIG. 5A). The continuous beam 112 is cut at a cutting station 116 to form a beam segment 118, which may also be referred to as a hollow extruded member, with ends generally perpendicular to the length 26 of the beam segment 118. The beam segments 118 are then accumulated in stacks for transportation. The continuous beam 112 and, therefore, the resultant header beam 10 of the illustrated embodiment is extruded primarily from aluminum, as previously described. It is also contemplated that the header beam 10 or portions thereof may be formed from alternative metals and may be alternatively roll formed, hydroformed, or alternatively joined, such as by laser or arc welding.

The beam segments 118, as shown at step 120 of FIG. 9, are unstacked, measured, and centered on a conveyor. The conveyor feeds the beam segments to a trimming station 121 where the rear flange 58 that extends continuously along the length of the beam segment 118 is trimmed. More specifically, the rear flange 58 is cut to form an elongated cutout 59 that defines rearward projections of the rear flange 58 proximate the end portions 32. It is contemplated that the rear flange 58 may be alternatively struck or otherwise cut to remove the elongated piece of the rear flange 58 that forms the elongated cutout 59.

As also shown in FIG. 9, at step 122, the end portions 32 of the beam segment 118 are clamped with a bending device 124 that securely attaches to the end portions 32 of the beam segment 118. The bending device 124 in the illustrated embodiment has two clamping units 126 that clamp the end portions 32 equally to center the beam segment 118 between the two clamping units 126. At step 128, the bending device 124 rotates the clamping units 126 in generally opposite directions to stretch bend the central portion 24 the beam segment 118 in a shape that conforms to the generally consistent curvature 28 across the central portion 24 of the beam segment 118. More specifically, the bending device 124 stretch bends the beam segment 118 in three dimensions, such that the rear flange 58 and the rear side wall 92 and the bottom wall 88 (FIG. 5A) of the body portion 54 undergo some compression in the stretch bending process. However, the elongated cutout 59 in the rear flange 58 significantly reduces compression in the rear flange 58 to prevent buckling or undesirable curvature during the stretch bending process. It is understood that in additional embodiments, the bending device 124 may have one clamping unit 126 that moves relative to a stationary clamping unit 126 to stretch and bend the beam segment 118 to the curvature 28. The clamping units 126 are released from the beam segment 118 in step 130, and the end portions of the beam segment remain generally straight, as previously described.

Still referring to FIG. 9, at step 132, a press with a cutting die 133 strikes the front flange 36 of the beam segment 118 with a pattern that provides generally uniform front edges 66 of the front flanges 36 across production of multiple beam segments 118. More specifically, the front flange 36 is struck to form the front edge 66 that is parallel to the curvature 28 proximate the end portions 32 of the beam for engaging the windshield 30. The cutting die 133 also forms the series of notches 40 on the center region 38 of the front flange 36 to reduce strain in the front flange 36 caused by the stretch bending process and to provide points of connection for the forward edge 17 of the roof panel 16. The notches 40 interface with the roof panel 16 to also provide an area to relieve fluid buildup between the front flange 36 and the roof panel 16 (FIG. 3), such as during the painting process of the vehicle body. Further, cutting the notches 40 in the front flange 36 also provides a weight savings in the center region 38 of front flange 36, which increases the load bearing capacity of the header beam 10 and reduces the overall weight of the header beam 10.

At steps 134 and 136, as shown in FIG. 9, the top and bottom surfaces 70, 56 of the body portion 54 of the beam segment 118 are machined and hydroformed to create the, access holes 68, the formation 104, and other features on the body portion 54, as previously described. In additional embodiments, several of the steps, including steps 134 and 136, may be done simultaneously, in additional separate steps, or may be done in any combination of steps. Furthermore, the machining and hydroforming may be replaced entirely or partially for forming any one of the features with alternative forming means, such as drilling, stamping, various forms of cutting, or other forming means as generally understood by one having ordinary skill in the art.

Figure 10:
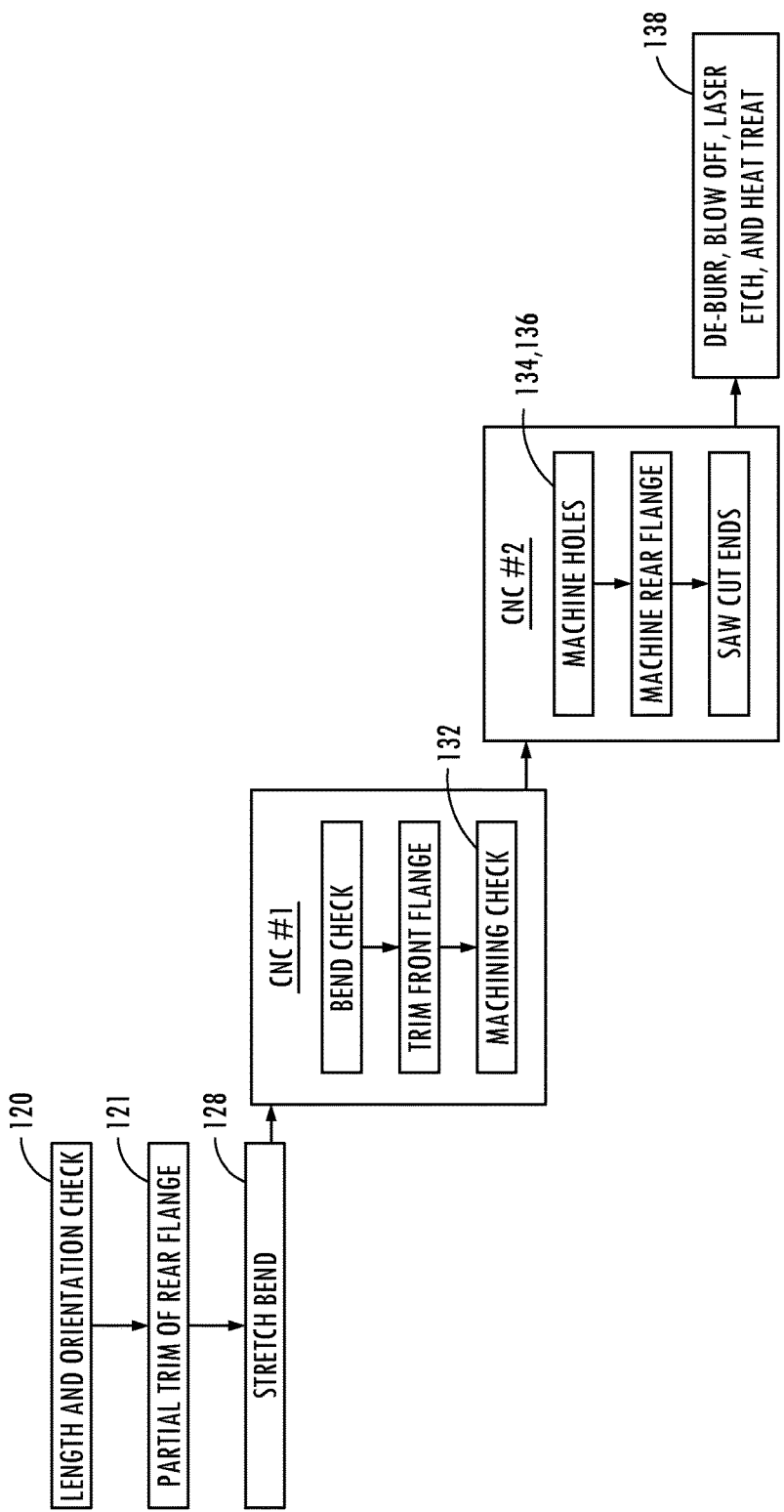
FIG. 10 is a flowchart showing a method of forming the header beam, according to yet another embodiment.

An additional flowchart is shown in FIG. 10, illustrating another embodiment of the method of forming the header beam 10 having several of the steps shown in FIG. 9. As shown, in the illustrated embodiment steps 120, 121, and 128 are performed to provide the curved beam segment 118 to a first CNC machine to performs step 132 along with performing a check for the appropriate bend to the curvature 28 and a check for the appropriately oriented front flange 36 proximate the end portions 32 and the center region 38. Upon checking the machining of the front flange 36, a second CNC machine performs steps 134 and 136 in addition to touching up the elongated cutout 59 in the rear flange 58 and cutting the ends to make the front flange 36 and the machined holes symmetrical about the midpoint of the header beam 10 and any other refining to put the header beam 10 within the manufacturing tolerances. Before, after, or between the CNC machines, the formation 107 of the illustrated embodiment may be made in the attachment section 98 by using a first tool to deform the bottom surface 56 of the bottom wall 88 into the internal volume 72. It is also contemplated that a second tool may be inserted through at least one of the access holes 68 in the top wall 86 and into the internal volume 72 to support an upper surface of the bottom wall 88 and to thereby regulate deformation caused by the first tool.

With further reference to FIG. 10, a last step 138 of the illustrated embodiment includes the finishing processes to the header beam 10, including de-burring, blowing off any debris on the header beam 10, laser etching an identification number and/or code, and heat treating the header beam 10. It is contemplated that the header beam 10 may be treated with heat or other means of altering the hardness of the beam at any point of the forming processes, as generally understood by one having ordinary skill in the art. Upon forming the beam segment 118 into the illustrated header beam 10, according to one method of assembly, the end portions 32 of the beam segment 118 are attached to the A-pillars 18 of the vehicle 42 (FIG. 2), the roof panel 16 is attached to the series of notches 40 and other attachment features on the front edge 66 or other portions of the header beam 10 (FIG. 3), and the windshield 30 is attached to the front edge 66 (FIG. 1), as generally shown and described above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for forming a vehicle header beam, comprising:
   providing an extruded hollow member having a central portion, exterior walls enclosing an elongated internal volume and a pair of interior walls extending along the elongated internal volume;
   bending the extruded hollow member to form a curvature; and
   forming a formation in the central portion and a bottom exterior wall that protrudes into the elongated internal volume between the interior walls for attaching a subassembly, wherein the forming a formation step further includes deforming a bottom surface of the bottom exterior wall into the elongated internal volume with a first tool and supporting an upper surface of the bottom exterior wall with a second tool to regulate deformation caused by the first tool.

2. The method of claim 1, wherein the formation is formed at a select location along a length of the extruded hollow member and includes an inset surface formed at a select angle, such that the formation is configured for attaching the subassembly to the inset surface.

3. The method of claim 1, further comprising:
   forming an aperture through the bottom exterior wall within an inset surface of the formation for receiving a fastener to secure a subassembly to the extruded hollow member.

4. A method for forming a vehicle header beam, comprising:
   providing an extruded hollow member having a central portion, exterior walls enclosing an elongated internal volume and an interior wall extending along the internal volume separating load and attachment sections;
   forming a formation in the central portion and one of the exterior walls protruding into or out of the attachment section; and
   forming a substantially planar outer surface in the formation disposed at an angle and a location configured for attaching a subassembly, wherein the forming a formation step further includes deforming a bottom surface of the one of the exterior walls into the elongated internal volume with a first tool and supporting an upper surface of the one of the exterior walls with a second tool to regulate deformation caused by the first tool.

5. The method of claim 4, wherein the exterior walls include a top wall in generally parallel alignment with a bottom wall, whereby the interior wall spans continuously between the top and bottom walls.

6. The method of claim 5, further comprising:
   forming a second interior wall spanning continuously between the top and bottom walls and spaced from the other interior wall, wherein the attachment section is defined between the interior walls.

7. The method of claim 5, wherein the formation is in the bottom wall and the outer surface is inset into the internal volume.

8. The method of claim 7, wherein the outer surface is substantially planar and angled relative to a planar extent of the bottom wall proximate the formation.

9. The method of claim 8, wherein the formation includes a second outer surface laterally spaced from the other outer surface and configured for attaching a second subassembly at an angle different from an angle of the other outer surface.

10. The method of claim 7, further comprising:
forming an attachment aperture formed through the bottom wall in the outer surface for receiving a fastener to secure the subassembly to the extruded hollow member, whereby the load section is void of apertures.

11. A method for forming a vehicle header beam, comprising:
bending an extruded hollow member having a central portion, exterior walls enclosing an elongated internal volume and an interior wall extending along the internal volume separating load and attachment sections;
forming a formation in the central portion and one of the exterior walls protruding into or out of the attachment section; and
configuring the formation with a substantially planar outer surface for attaching a subassembly, wherein the forming a formation step further includes deforming a bottom surface of the one of the exterior walls into the elongated internal volume with a first tool and supporting an upper surface of one of the exterior walls with a second tool to regulate deformation caused by the first tool.

12. The method of claim 11, wherein the configuring the formation step includes forming a substantially planar outer surface in the formation disposed at an angle and a location configured for attaching a subassembly.

13. The method of claim 11, wherein the exterior walls include a top wall in generally parallel alignment with a bottom wall, whereby the interior wall spans continuously between the top and bottom walls.

14. The method of claim 13, further comprising:
forming a second interior wall spanning continuously between the top and bottom walls and spaced from the other interior wall, wherein the attachment section is defined between the interior walls.

15. The method of claim 13, wherein the formation is in the bottom wall and the outer surface is inset into the internal volume.

16. The method of claim 15, wherein the outer surface is substantially planar and angled relative to a planar extent of the bottom wall proximate the formation.

17. The method of claim 16, wherein the formation includes a second outer surface laterally spaced from the other outer surface and configured for attaching a second subassembly at an angle different from an angle of the other outer surface.

18. The method of claim 15, further comprising:
forming an attachment aperture formed through the bottom wall in the outer surface for receiving a fastener to secure the subassembly to the extruded hollow member, whereby the load section is void of apertures.

19. The method of claim 11, wherein the extruded hollow member comprises an elongated cutout formed in the member prior to the bending step.

* * * * *